United States Patent

[11] 3,626,862

[72] Inventors Gerhard Korn
Mulheim-Ruhr;
Horst Konig, Hattingen; Hans Dieter Klein,
Heiligenhaus, all of Germany
[21] Appl. No. 842,441
[22] Filed July 15, 1969
[45] Patented Dec. 14, 1971
[73] Assignee Rheinstahl Huttenwerke AG
Essen, Germany
[32] Priority July 16, 1968
[33] Germany
[31] G 67 50 770

[54] RESILIENT DUAL AXLE DRIVE TRUCK
6 Claims, 6 Drawing Figs.
[52] U.S. Cl. ................................................ 105/131,
105/132.1, 188/33, 188/59, 188/72.8, 295/36 R
[51] Int. Cl. ........................................................ B60b 35/12,
B61c 9/44, B61c 9/52
[50] Field of Search............................................. 105/131,
132.1; 295/36, 36 R; 188/33, 59, 72.8

[56] References Cited
UNITED STATES PATENTS
| | | | |
|---|---|---|---|
| 568,779 | 10/1896 | Lockwood | 105/131 X |
| 2,404,115 | 7/1946 | Williams | 105/131 |
| 2,747,918 | 5/1956 | Blackwood | 295/36 |

*Primary Examiner*—Arthur L. La Point
*Assistant Examiner*—Howard Beltran
*Attorney*—McGlew and Toren

ABSTRACT: A dual axle drive for rail vehicles, having a pair of axles supported in a truck frame and each carrying a pair of wheels, includes a driving motor unit oriented in the direction of travel and driving the wheels through angle transmissions connected to opposite ends of the motor unit. The motor unit and the angle transmissions are separately supported from the truck frame, and each angle transmission includes a torque tube enclosing the central portion of an axle. Resilient torsional couplings connect each transmission to a respective opposite end of the motor unit. Torque tubes are provided on each axle, each enclosing the axle with clearance and each extending between the transmission torque tube and the adjacent wheel. Compensation couplings connect one end of each of these torque tubes to the transmission torque tube and the other end thereof to a wheel. The compensation couplings may be designed as torsion-resistant steel plate couplings and may connect either the web or a hub bushing flange of a wheel to the adjacent torque tube end. Braking devices are arranged on the input shafts of the angle transmissions.

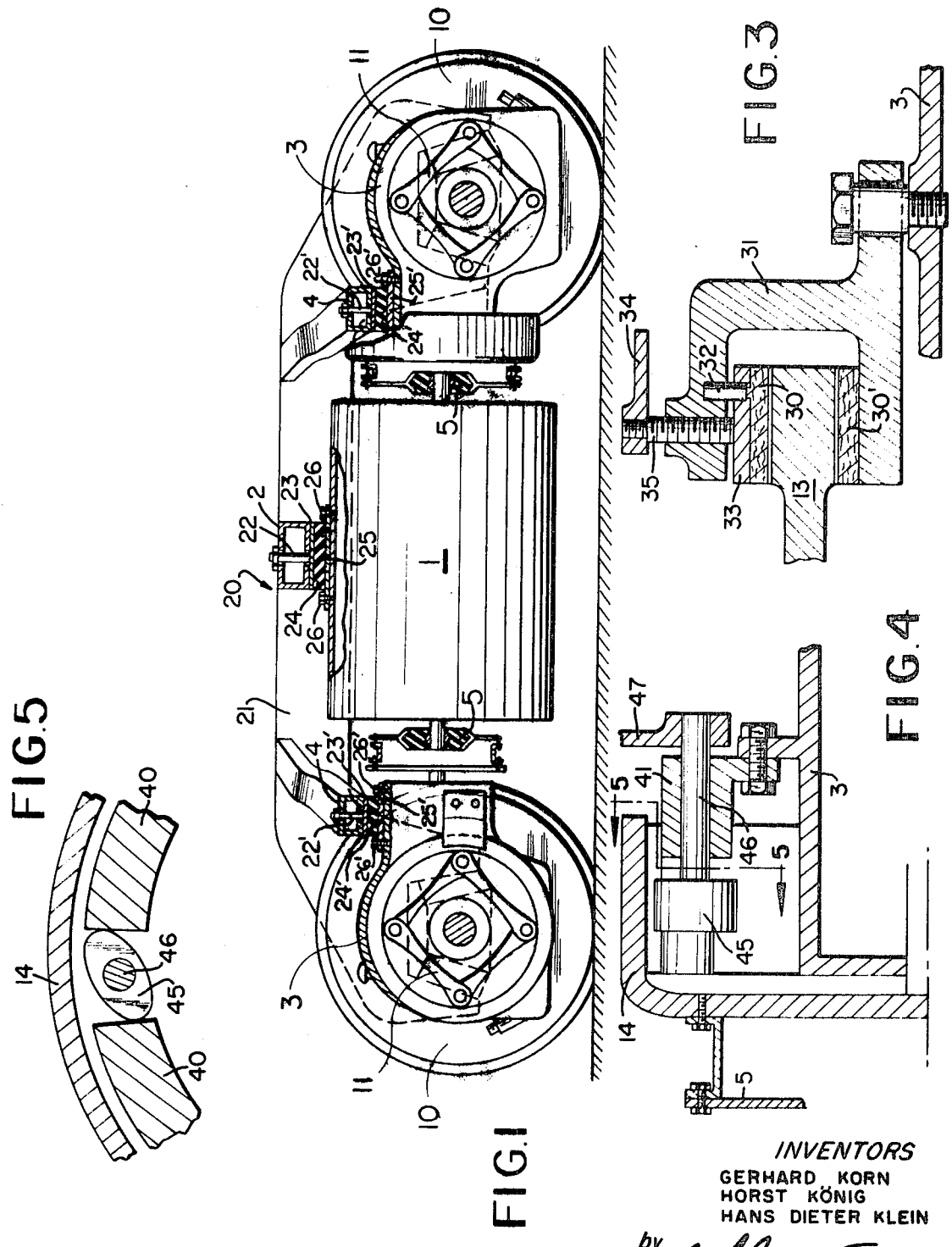

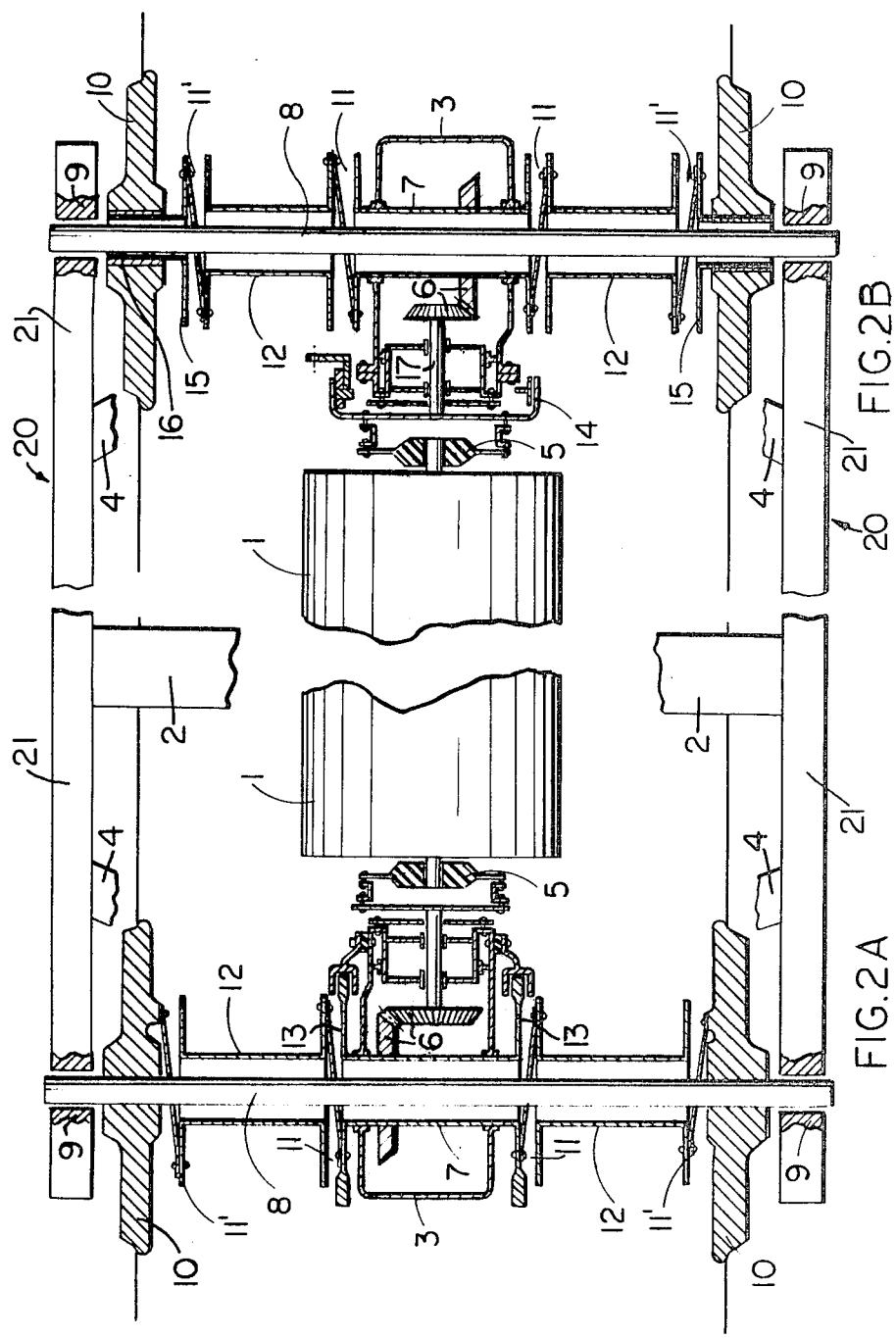

RESILIENT DUAL AXLE DRIVE TRUCK

BACKGROUND OF THE PRIOR ART

There are known dual axle drives for self-propelled rail vehicles including an electric motor oriented in the direction of the travel and driving the two sets of wheels through respective angle transmissions. Each angle transmission is flange connected to a respective end of the motor, or of the motor-gear unit, and includes a torque tube surrounding an axle. Both ends of this torque tube are connected with the axle by a respective resilient rubber coupling.

In these arrangements, the motor, with the flange-connected angle transmissions, rests like a bridge on the axles carrying the wheels, so that the rubber couplings must support the weight of the drive unit in addition to transmitting and absorbing the reaction moments or torques of the motor. In order to reduce, in this type of construction, the stress on the angle transmissions by unilateral wheel motion, the torque tube, and thus the spacing between the rubber couplings is designed to be as short as possible. Additionally, in this design, the axles are simultaneously stressed in a very unfavorable manner for flexure and torsion, a particular disadvantage being that those masses which are either unsprung or only slightly spring supported are very large.

In order to obviate this disadvantage, it has been proposed to support the drive motor, together with the flange-connected angle transmissions rigidly in the truck frame, and to connect the torque tubes of the angle transmissions with the axles by a tubular universal drive shaft. This universal drive shaft is connected at one end to the torque tube of the associated angle transmission through the medium of rubber couplings, and is connected at the other end with the axle or with one wheel of the axle through a link and lever coupling or vice versa. Usually the brake disk, in this arrangement, is arranged at the other end of the axle.

This arrangement, in which a torsion moment is transmitted through the full length of the axle under driving conditions as well as under braking conditions, requires a correspondingly reinforced design of the axles, and therefore runs counter to efforts directed toward lightweight construction of the drive and especially of the wheel sets.

SUMMARY OF THE INVENTION

This invention relates to a dual axle drive for self-propelled rail vehicles, such as streetcars, and, more particularly, to such a drive in which there is a substantial reduction of the unsprung masses and of the torsional stresses in the wheel axles.

The objective of the invention is to improve a dual axle drive for self-propelled rail vehicles having a pair of axles supported in a truck frame and each carrying a pair of wheels, to increase the ability to use lightweight wheel sets which are necessary for higher travel velocities. The invention is based on a dual axle drive in which the driving motor unit is oriented in the direction of travel and is supported by the truck frame, the driving unit driving the wheels through angle transmissions connected to opposite ends of the driving unit, with each of the angle transmissions including torque tubes surrounding the wheel axles and having couplings at both ends.

In accordance with the invention, the angle transmissions and the drive unit are separately supported or suspended on the truck frame, with the angle transmissions being connected with the drive unit by means of torsionally resilient couplings. The torque tubes of the angle transmissions have their ends connected directly with the wheels of the axles through what might be termed coupling torque tubes which surround the axles with clearance. Compensator couplings are interposed between the angle transmission torque tubes and the coupling torque tubes, and between the coupling torque tubes and the respective wheels, these compensator couplings preferably comprising steel plate couplings.

By virtue of this arrangement, the wheel axles are, on the one hand, free of any torsional stresses and can be designed with very small weight as they are stressed only flexurally. On the other hand, the angle transmissions, which are supported from the truck frame separately from the drive unit, need to transmit, to the frame, only the reaction force of the gearing. Thus, the angle transmissions also can be designed extremely lightweight, as they are not necessary to aid the stiffening of the frame. Instead, the resilient coupling compensates for any possibly occurring displacements between the angle transmissions and the drive unit. The preferably used torsion-resistant steel plate couplings also can be built with little weight and, furthermore, are completely maintenance free.

If it is desired also to use light-metal or lightweight wheels, in accordance with a further feature of the invention, the coupling torque tubes are connected to flanges of steel bushings which are shrunk into the hubs of the light-metal wheels.

In case the vehicle must be decelerated solely by means of friction brakes, as is, for example, required for standard-gauge railroads, a characteristic of the invention further consists in that the braking devices, such as brake disks or brake drums, of the wheel sets are arranged directly at the end faces of the torque tubes of the angle transmissions. However, the braking devices also can be arranged, instead, on the input shafts of the angle transmissions. Through this arrangement, the axles are further completely relieved of the weight of the braking devices and of the resulting torsion moment.

An object of the invention is to provide an improved dual axle drive for self-propelled rail vehicles having a pair of axles supported in a truck frame and each carrying a pair of wheels.

Another object of the invention is to provide such a dual axle drive in which there is a substantial reduction of the unsprung masses.

A further object of the invention is to provide such a dual axle drive in which the wheel axles are freed of torsional stresses.

Another object of the invention is to provide such a dual axle drive including a driving motor unit oriented in the direction of travel and supported by the truck frame, and angle transmissions connected to opposite ends of the motor unit and supported in the truck frame independently of the motor unit.

A further object of the invention is to provide such a dual axle drive in which the angle transmissions are connected with the motor unit through torsionally resilient couplings, and include torque tubes.

Another object of the invention is to provide such a dual axle drive in which the torque tubes of the angle transmissions are connected to respective pairs of coupling torque tubes embracing the associated axle, with each coupling torque tube being connected to a respective wheel of the axle.

A further object of the invention is to provide such a dual axle drive in which each coupling torque tube is coupled by a pair of compensator couplings to the transmission torque tube and to the associated wheel.

Another object of the invention is to provide such a dual axle drive in which the braking devices are arranged on the angle transmissions so that the axles are relieved completely of the weight of the braking devices and of the torsion braking moment.

For an understanding of the principles of the invention, reference is made to the following descriptions of typical embodiments thereof as illustrated in the accompanying drawings:

BRIEF DESCRIPTION OF THE DRAWINGS

In the Drawings:

FIG. 1 is a side elevation of a dual axle drive for self-propelled rail vehicles embodying the present invention;

FIGS. 2A and 2B together are a horizontal cross section through the dual axle drive shown in FIG. 1, each illustrating a different embodiment;

FIG. 3 is an enlarged sectional view of the disc brakes shown in FIG. 2A;

FIG. 4 is an enlarged sectional view of the drum brake shown in FIG. 2B; and

FIG. 5 is a sectional view taken on the line 5—5 of FIG. 4.

DESCRIPTION OF THE PREFERRED EMBODIMENTS

Referring to the drawings, a drive unit 1, such as an electric motor with or without reduction gearing, is connected to the frame 21 of a truck 20. The connection is effected through a truck crossmember 2 secured to a bolt 22 welded or otherwise integral with a plate 23 vulcanized or bonded to the upper surface of a rubber block 24 having a plate 25 vulcanized or otherwise bonded to its lower surface and connected to the casing of motor 1 by studs 26. Angle transmissions 3 are supported, separately from drive unit 1, by the truck frame 21 by the truck crossmembers 4 which are secured to bolts 22' integral with metal plates 23' bonded to the upper surfaces of rubber blocks 24' whose lower surfaces are bonded to metal plates 25' secured to transmissions 3 by studs 26'. Angle transmissions 3 are driven by drive unit 1 through tortionally resilient couplings 5, and the torque is transmitted through bevel gears 6 to torque tubes 7 surrounding the wheel axles 8 which, in turn, are supported on the truck frame in bearings 9.

The torque is transmitted from transmission torque tube 7 to wheels 10, on axles 8, through torsion-resistant steel plate couplings 11 each connecting a respective opposite end of a transmission torque tube 7 to the inner end of a respective axle torque tube 12. Torque tubes 12 also enclose axles 8, with clearance, and their outer ends are connected, through steel plate couplings 11' to their respective wheels 10. The insertion of coupling torque tubes 12, in conjunction with the compensator couplings 11 and 11', which latter act like two series-connected joints, provides for a force-free parallel and angular displacement of wheel axles 8 relative to angle transmissions 3.

FIG. 2A illustrates the coupling torque tubes 12 as connected to the webs of wheel 10, and further illustrates disc brakes 13 arranged on the end faces of transmission torque tube 7 of the angle transmissions 3.

Referring to FIG. 3, each brake disc 13 is arranged to be gripped between a pair of brake shoes 30 and 30'. Brake shoe 30' is fixed to a brake casing 31 bolted to angle transmission 3, whereas brake shoe 30 is mounted on a backing or pressure plate 33 carrying a pin 32 slidable in an aperture in casing 31. Each disc brake is engaged by operation of a lever 34 secured to the outer end of a stud 35 threadedly engaged through a portion of casing 31 and having its inner end abutting against pressure plate 33. The levers 34 can be electromagnetically operated either individually or conjointly but, as a rule, are operated conjointly.

FIG. 2B illustrates an arrangement in which wheels 10 are designed as light-metal wheels. In this case, wheels 10 are connected with coupling torque tubes 12, through couplings 11', with flanges 15 of steel bushings 16 which are shrunk into the hubs of the wheels. FIG. 2B further illustrates, by way of example, a drum brake 14 on the input shaft 17 of angle transmission 3.

Referring to FIGS. 4 and 5, drum brake 14 is cooperable with brake shoes 40 which have ends pivotally mounted on a brake shoe support plate 41 secured to the casing of transmission 3, with the free ends of brake shoes 40 being cooperable with the cam 45 secured to a shaft 46 operable by a lever 47. Lever 47 may be electromagnetically operated, or may be operated in any other suitable manner to engage and disengage brake shoes 40 relative to brake drum 14.

While the invention has been illustrated as applied to a dual axle drive for self-propelled rail vehicles, it will be understood that the drive also can be used with more than two axles.

While specific embodiments of the invention have been shown and described to illustrate the application of the principles of the invention, it will be understood that the invention may be embodied otherwise without departing from such principles.

What is claimed is:

1. In a dual axle drive for self-propelled rail vehicles having at least a pair of axles supported in a truck frame and each carrying a pair of wheels, a driving motor unit oriented in the direction of travel and supported by the truck frame, the driving motor unit driving the wheels through bevel gear angle transmissions connected to opposite ends of the motor unit and each angle transmission including a bevel gear on a transmission torque tube enclosing an axle and having couplings at its opposite ends connected for driving the wheels: the improvement comprising, in combination, respective means separately supporting said motor unit and said transmissions from the truck frame; resilient torsional couplings connecting each of said transmissions to opposite ends of said motor unit; coupling torque tubes on each axle each enclosing the axle with clearance and each extending between a respective opposite end of the associated transmission torque tube and a respective wheel; and respective compensation couplings connecting one end of each coupling torque tube to the associated transmission torque tube and the other end thereof directly to a wheel independently of the axle supporting the wheel.

2. In a dual axle drive for self-propelled rail vehicles, the improvement claimed in claim 1, in which said compensation couplings comprise torsion-resistant steel plate couplings.

3. In a dual axle drive for self-propelled rail vehicles, the improvement claimed in claim 1, in which the compensation couplings at the outer end of each coupling torque tube are connected to the webs of the associated wheels.

4. In a dual axle drive for self-propelled rail vehicles, the improvement claimed in claim 1, in which said wheels are lightweight metal; flanged steel bushings shrunk into the hubs of said wheels and engaged with said axles; the compensation couplings at the outer end of each coupling torque tube being connected to the flanges of said bushings.

5. In a dual axle drive for self-propelled rail vehicles, the improvement claimed in claim 1, including braking devices for said wheels; each braking device including brake shoes mounted on the associated transmission and selectively engageable with brake discs secured directly to the opposite ends of the associated transmission torque tube.

6. In a dual axle drive for self-propelled rail vehicles, the improvement claimed in claim 1, in which each angle transmission includes an input shaft connected by a respective resilient torsional coupling to the adjacent end of said motor unit; and braking devices for said wheels, each braking device including a brake drum secure to the associated input shaft and brake shoes mounted on the associated transmission and selectively engageable with the respective brake drum.

* * * * *